(12) United States Patent
Feria et al.

(10) Patent No.: US 6,891,813 B2
(45) Date of Patent: May 10, 2005

(54) DYNAMIC CELL CDMA CODE ASSIGNMENT SYSTEM AND METHOD

(75) Inventors: Ying Feria, Manhattan Beach, CA (US); Ming Chang, Rancho Palos Verdes, CA (US); Donald Chang, Thousand Oaks, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 784 days.

(21) Appl. No.: 09/735,861

(22) Filed: Dec. 12, 2000

(65) Prior Publication Data

US 2002/0080732 A1 Jun. 27, 2002

(51) Int. Cl.$^7$ ................................................ H04Q 7/20
(52) U.S. Cl. .................... 370/329; 370/310.2; 370/316; 370/320; 370/328
(58) Field of Search ................................ 370/254, 255, 370/310.2, 316, 317, 320, 323, 324, 325, 328, 329, 331, 334, 335, 338, 339, 341, 342, 431, 437, 441; 375/146, 346, 347; 455/403, 422.1, 445, 446, 450, 456.3, 500, 522; 342/354; 343/745

(56) References Cited

U.S. PATENT DOCUMENTS

| | | | |
|---|---|---|---|
| 2,470,787 A | 5/1949 | Nosker | |
| 3,384,891 A | 5/1968 | Anderson | 343/100 |
| 3,541,553 A | 11/1970 | Gubin | |
| 3,544,995 A | 12/1970 | Bottenburg et al. | 343/6 |
| 3,593,138 A | 7/1971 | Dunn et al. | |
| 3,611,435 A | 10/1971 | Cooper | |
| 3,720,953 A | 3/1973 | Ajioka | |
| 3,742,498 A | 6/1973 | Dunn | |
| 3,982,075 A | 9/1976 | Jefferis et al. | |

(Continued)

FOREIGN PATENT DOCUMENTS

| | | |
|---|---|---|
| EP | 0 335 558 A3 | 4/1989 |
| EP | 0 549 220 A2 | 6/1993 |
| EP | 0 682 416 A2 | 11/1995 |
| EP | 0 749 252 A2 | 12/1996 |
| EP | 0 776 099 A2 | 5/1997 |
| EP | 0 837 568 A2 | 4/1998 |
| EP | 0 845 874 A2 | 6/1998 |
| EP | 0 860 708 A2 | 8/1998 |
| EP | 0 860 709 A2 | 8/1998 |

(Continued)

OTHER PUBLICATIONS

U.S. patent application Ser. No. 09/539,964, Rosen et al., filed Mar. 31, 2000.
U.S. patent application Ser. No. 09/566,759, Novak et al., filed May 5, 2000.
U.S. patent application Ser. No. 09/611,753, Chang et al., filed Jul. 7, 2000.
U.S. patent application Ser. No. 09/721,854, Rosen et al., filed Nov. 22, 2000.
Agnew et al., "The AMSC Mobile Satellite System", Proceedings of the Mobile Satellite Conference, May 3–5, 1999 NASA, JPL Publication 988–9, pp. 3–9.

(Continued)

*Primary Examiner*—Wellington Chin
*Assistant Examiner*—John Shew
(74) *Attorney, Agent, or Firm*—Georgann S. Grunebach

(57) ABSTRACT

A communications system and method of operating the communications system includes a high altitude communication device that communicates with a plurality of user terminals and a gateway station. The gateway station couples the users to terrestrial networks and other users. The high altitude communication device has a controller that assigns a first code to a beam of a first plurality of users. When one of the first plurality of users moves to interfere with one of the other of the first plurality of users, the beam associated with the user is reassigned another code.

25 Claims, 4 Drawing Sheets

U.S. PATENT DOCUMENTS

| | | |
|---|---|---|
| 4,019,138 A | 4/1977 | Wantanabe et al. |
| 4,161,730 A | 7/1979 | Anderson |
| 4,161,734 A | 7/1979 | Anderson |
| 4,236,161 A | 11/1980 | Ohm |
| 4,359,733 A | 11/1982 | O'Neill |
| 4,555,782 A | 11/1985 | Alaria et al. |
| 4,613,864 A | 9/1986 | Hofgen |
| 4,635,063 A | 1/1987 | Chang et al. |
| 4,689,625 A | 8/1987 | Barmat |
| 4,799,065 A | 1/1989 | Thompson |
| 4,819,227 A | 4/1989 | Rosen .......................... 370/75 |
| 4,823,341 A | 4/1989 | Rosen |
| 4,897,661 A | 1/1990 | Hiraiwa |
| 4,901,307 A | 2/1990 | Gilhousen et al. |
| 4,979,170 A | 12/1990 | Gilhousen et al. ........ 370/104.1 |
| 4,994,809 A | 2/1991 | Yung et al. |
| 5,006,855 A | 4/1991 | Braff |
| 5,017,927 A | 5/1991 | Agrawal et al. |
| 5,077,562 A | 12/1991 | Chang et al. |
| 5,077,759 A | 12/1991 | Nakahara |
| 5,081,464 A | 1/1992 | Renshaw |
| 5,099,245 A | 3/1992 | Sagey |
| 5,109,390 A | 4/1992 | Gilhousen et al. |
| 5,111,209 A | 5/1992 | Toriyama |
| 5,126,748 A | 6/1992 | Ames et al. |
| 5,151,706 A | 9/1992 | Roederer et al. |
| 5,218,619 A | 6/1993 | Dent |
| 5,233,626 A | 8/1993 | Ames ............................ 375/1 |
| 5,245,612 A | 9/1993 | Kachi et al. |
| 5,278,863 A | 1/1994 | Briskman ...................... 375/1 |
| 5,319,673 A | 6/1994 | Briskman ...................... 375/1 |
| 5,327,455 A | 7/1994 | DeGaudenzi et al. |
| 5,361,398 A | 11/1994 | Christian et al. |
| 5,365,447 A | 11/1994 | Dennis |
| 5,379,320 A | 1/1995 | Fermandes et al. |
| 5,387,916 A | 2/1995 | Cohn |
| 5,408,237 A | 4/1995 | Patterson et al. |
| 5,410,314 A | 4/1995 | Frush et al. |
| 5,416,808 A | 5/1995 | Witsaman et al. |
| 5,423,058 A | 6/1995 | Cudak et al. |
| 5,423,059 A | 6/1995 | LoGalbo et al. |
| 5,444,450 A | 8/1995 | Olds et al. |
| 5,467,282 A | 11/1995 | Dennis |
| 5,475,520 A | 12/1995 | Wissinger |
| 5,485,485 A | 1/1996 | Briskman et al. ........... 375/200 |
| 5,510,797 A | 4/1996 | Abraham et al. |
| 5,525,995 A | 6/1996 | Benner |
| 5,550,809 A | 8/1996 | Bottomley et al. |
| 5,555,257 A | 9/1996 | Dent |
| 5,555,444 A | 9/1996 | Diekelman et al. |
| 5,572,216 A | 11/1996 | Weinberg et al. ........... 342/357 |
| 5,589,834 A | 12/1996 | Weinberg |
| 5,592,471 A | 1/1997 | Briskman .................. 455/52.3 |
| 5,594,941 A | 1/1997 | Dent |
| 5,608,722 A | 3/1997 | Miller |
| 5,612,701 A * | 3/1997 | Diekelman .................. 342/354 |
| 5,613,219 A | 3/1997 | Vogel et al. |
| 5,617,410 A | 4/1997 | Matsumoto |
| 5,625,640 A | 4/1997 | Palmer et al. |
| 5,644,572 A | 7/1997 | Olds et al. .................. 370/324 |
| 5,696,766 A | 12/1997 | Yeung et al. |
| 5,732,351 A | 3/1998 | Olds et al. |
| 5,739,785 A | 4/1998 | Allison et al. |
| 5,754,139 A | 5/1998 | Turcotte et al. |
| 5,764,188 A | 6/1998 | Ghosh et al. |
| 5,790,070 A | 8/1998 | Natarajan et al. ........... 342/354 |
| 5,810,284 A | 9/1998 | Hibbs et al. |
| 5,828,659 A | 10/1998 | Teder et al. |
| 5,839,053 A | 11/1998 | Bosch et al. |
| 5,856,804 A | 1/1999 | Turcotte et al. ............. 342/371 |
| 5,862,480 A | 1/1999 | Wild et al. |
| 5,864,579 A | 1/1999 | Briskman .................... 375/200 |
| 5,867,109 A | 2/1999 | Wiedeman |
| 5,878,034 A | 3/1999 | Hershey et al. |
| 5,890,067 A | 3/1999 | Chang et al. |
| 5,899,957 A | 5/1999 | Loomis |
| 5,903,549 A | 5/1999 | Von der Embse et al. |
| 5,907,813 A | 5/1999 | Johnson, Jr. et al. |
| 5,907,816 A | 5/1999 | Newman et al. |
| 5,909,460 A | 6/1999 | Dent |
| 5,909,470 A | 6/1999 | Barratt et al. |
| 5,917,447 A | 6/1999 | Wang et al. |
| 5,918,157 A | 6/1999 | Wiedeman et al. |
| 5,920,284 A | 7/1999 | Victor |
| 5,937,332 A | 8/1999 | Karabinis |
| 5,940,774 A | 8/1999 | Schmidt et al. |
| 5,943,331 A | 8/1999 | Lavean |
| 5,944,770 A | 8/1999 | Enge et al. |
| 5,945,948 A | 8/1999 | Buford et al. |
| 5,946,625 A | 8/1999 | Hassan et al. |
| 5,949,766 A | 9/1999 | Ibanez-Meier et al. |
| 5,956,619 A | 9/1999 | Gallagher et al. |
| 5,966,371 A | 10/1999 | Sherman |
| 5,969,674 A | 10/1999 | Von Der Embse et al. .................... 342/357.16 |
| 5,973,647 A | 10/1999 | Barrett et al. |
| 5,974,039 A | 10/1999 | Schilling |
| 5,974,317 A | 10/1999 | Djuknic et al. |
| 5,974,324 A | 10/1999 | Henson |
| 5,982,337 A | 11/1999 | Newman et al. |
| 5,983,113 A | 11/1999 | Asanuma |
| 5,990,928 A | 11/1999 | Sklar et al. |
| 6,002,935 A | 12/1999 | Wang |
| 6,014,372 A | 1/2000 | Kent et al. |
| 6,016,124 A | 1/2000 | Lo et al. |
| 6,018,316 A | 1/2000 | Rudish et al. |
| 6,020,845 A | 2/2000 | Weinberg et al. |
| 6,023,463 A | 2/2000 | Wiedeman et al. |
| 6,028,884 A | 2/2000 | Silberger et al. |
| 6,032,041 A | 2/2000 | Wainfan et al. |
| 6,040,798 A | 3/2000 | Kinal et al. |
| 6,047,186 A | 4/2000 | Yu et al. |
| 6,061,562 A | 5/2000 | Martin et al. |
| 6,067,442 A | 5/2000 | Wiedeman et al. |
| 6,072,986 A | 6/2000 | Blanchard et al. |
| 6,088,341 A | 7/2000 | Hinedi et al. |
| 6,104,911 A | 8/2000 | Diekelman |
| 6,111,542 A | 8/2000 | Day et al. ................... 342/359 |
| 6,119,016 A | 9/2000 | Matusevich |
| 6,125,261 A | 9/2000 | Anselmo et al. |
| 6,138,012 A | 10/2000 | Krutz et al. ................. 455/427 |
| 6,138,020 A | 10/2000 | Galyas et al. |
| 6,147,658 A | 11/2000 | Higashi et al. |
| 6,150,977 A | 11/2000 | Wilcoxson et al. |
| 6,151,308 A | 11/2000 | Ibanez-Meier et al. ..... 370/316 |
| 6,157,621 A | 12/2000 | Brown et al. |
| 6,167,263 A | 12/2000 | Campbell |
| 6,169,910 B1 | 1/2001 | Tamil et al. |
| 6,173,178 B1 | 1/2001 | Hammill et al. |
| 6,175,737 B1 | 1/2001 | Kao |
| 6,176,451 B1 | 1/2001 | Drymon |
| 6,178,328 B1 | 1/2001 | Tang et al. |
| 6,188,896 B1 | 2/2001 | Perahia et al. |
| 6,195,037 B1 | 2/2001 | Gross et al. |
| 6,195,555 B1 | 2/2001 | Dent |
| 6,198,920 B1 | 3/2001 | Doviak et al. |
| 6,201,797 B1 | 3/2001 | Leuca et al. |
| 6,205,320 B1 | 3/2001 | Coleman |
| 6,208,858 B1 | 3/2001 | Antonio et al. |
| 6,236,834 B1 | 5/2001 | Poskett et al. |
| 6,240,072 B1 | 5/2001 | Lo et al. |

| | | |
|---|---|---|
| 6,243,587 B1 | 6/2001 | Dent et al. |
| 6,246,363 B1 | 6/2001 | Yung et al. |
| 6,266,533 B1 | 7/2001 | Zadeh et al. |
| 6,272,317 B1 | 8/2001 | Houston et al. |
| 6,289,211 B1 | 9/2001 | Koorapaty et al. |
| 6,295,440 B2 | 9/2001 | Chang et al. |
| 6,298,238 B1 | 10/2001 | Dai |
| 6,308,045 B1 | 10/2001 | Wright et al. |
| 6,311,068 B1 | 10/2001 | Leung et al. |
| 6,313,790 B2 | 11/2001 | Chang et al. |
| 6,314,269 B1 | 11/2001 | Hart et al. |
| 6,317,412 B1 | 11/2001 | Natali et al. |
| 6,317,420 B1 | 11/2001 | Schiff |
| 6,324,381 B1 | 11/2001 | Anselmo et al. |
| 6,324,398 B1 | 11/2001 | Lanzerotti et al. |
| 6,336,030 B2 | 1/2002 | Houston et al. |
| 6,337,980 B1 | 1/2002 | Chang et al. |
| 6,339,611 B1 | 1/2002 | Antonio et al. |
| 6,339,708 B1 | 1/2002 | Wang |
| 6,340,947 B1 | 1/2002 | Chang et al. |
| 6,366,256 B1 | 4/2002 | Ramanujam et al. |
| 6,366,761 B1 | 4/2002 | Montpetit |
| 6,374,080 B2 | 4/2002 | Uchida |
| 6,377,208 B2 | 4/2002 | Chang et al. |
| 6,380,893 B1 | 4/2002 | Chang et al. |
| 6,381,228 B1 | 4/2002 | Prieto, Jr. et al. |
| 6,385,434 B1 | 5/2002 | Chuprun et al. |
| 6,388,615 B1 | 5/2002 | Chang et al. |
| 6,392,611 B1 | 5/2002 | Smith et al. |
| 6,396,819 B1 | 5/2002 | Fleeter et al. |
| 6,408,180 B1 | 6/2002 | McKenna et al. |
| 6,414,646 B2 | 7/2002 | Luh |
| 6,418,158 B1 | 7/2002 | Vishwanath et al. |
| 6,424,831 B1 | 7/2002 | Schiff |
| 6,434,384 B1 | 8/2002 | Norin et al. |
| 6,438,379 B1 | 8/2002 | Gitlin et al. |
| 6,452,541 B1 | 9/2002 | Zhao et al. |
| 6,452,962 B1 | 9/2002 | Linsky et al. |
| 6,456,846 B2 | 9/2002 | Norin et al. |
| 6,463,282 B2 | 10/2002 | Norin et al. |
| 6,463,294 B1 | 10/2002 | Holma et al. |
| 6,480,788 B2 | 11/2002 | Kilfeather et al. |
| 6,501,941 B1 | 12/2002 | Chang et al. |
| 6,507,314 B2 | 1/2003 | Chang et al. |
| 6,507,739 B1 | 1/2003 | Gross et al. |
| 6,513,758 B1 | 2/2003 | Lloyd |
| 6,529,740 B1 * | 3/2003 | Ganucheau et al. ......... 455/519 |
| 6,542,754 B1 | 4/2003 | Sayers et al. |
| 6,563,457 B2 | 5/2003 | Chang et al. |
| 6,567,052 B1 * | 5/2003 | Wang et al. ................ 343/765 |
| 6,570,858 B1 | 5/2003 | Emmons, Jr. et al. |
| 6,574,270 B1 * | 6/2003 | Madkour et al. ........... 375/148 |
| 6,591,084 B1 * | 7/2003 | Chuprun et al. ........... 455/3.05 |
| 6,615,024 B1 | 9/2003 | Boros et al. |
| 6,633,559 B1 | 10/2003 | Asokan et al. |
| 6,665,316 B1 | 12/2003 | Eidson |
| 6,756,937 B1 | 6/2004 | Chang et al. |
| 6,757,546 B1 | 6/2004 | Hagen et al. |
| 6,763,242 B1 | 7/2004 | Feria et al. |
| 2001/0000167 A1 | 4/2001 | Chang et al. |
| 2001/0045903 A1 | 11/2001 | Chang et al. |
| 2001/0048389 A1 | 12/2001 | Nakagawa |
| 2002/0006795 A1 | 1/2002 | Norin |
| 2002/0041575 A1 | 4/2002 | Karabinis et al. |
| 2002/0050946 A1 | 5/2002 | Chang et al. |
| 2002/0072332 A1 | 6/2002 | Chang et al. |
| 2002/0072360 A1 | 6/2002 | Chang et al. |
| 2002/0072361 A1 | 6/2002 | Knoblach et al. |
| 2002/0072374 A1 | 6/2002 | Chang et al. |
| 2002/0073437 A1 | 6/2002 | Chang et al. |
| 2002/0080732 A1 | 6/2002 | Feria et al. |
| 2002/0081969 A1 | 6/2002 | Chang et al. |
| 2002/0106041 A1 | 8/2002 | Chang et al. |
| 2002/0107034 A1 | 8/2002 | Chang et al. |
| 2002/0118654 A1 | 8/2002 | Chang et al. |
| 2002/0126042 A1 | 9/2002 | Chang et al. |
| 2002/0128044 A1 | 9/2002 | Chang et al. |
| 2002/0128045 A1 | 9/2002 | Chang et al. |
| 2002/0146058 A1 | 10/2002 | Feria et al. |
| 2002/0150067 A1 | 10/2002 | Feria et al. |
| 2002/0168991 A1 | 11/2002 | Kochanski et al. |
| 2003/0076258 A1 | 4/2003 | Chang et al. |
| 2003/0083103 A1 | 5/2003 | Drawert |
| 2003/0231613 A1 | 12/2003 | Bertrand et al. |
| 2004/0032883 A1 | 2/2004 | Knapp et al. |

FOREIGN PATENT DOCUMENTS

| | | |
|---|---|---|
| EP | 0 860 710 A2 | 8/1998 |
| EP | 0 860 952 A2 | 8/1998 |
| EP | 0 887 951 A2 | 12/1998 |
| EP | 1 010 988 A2 | 6/2000 |
| EP | 1 037 403 A2 | 9/2000 |
| EP | 1 139 583 A2 | 10/2001 |
| EP | 1 148 662 A2 | 10/2001 |
| EP | 1 152 552 A2 | 11/2001 |
| EP | 1 158 698 A2 | 11/2001 |
| EP | 1 161 001 A2 | 12/2001 |
| GB | 2 271 902 A | 10/1993 |
| GB | 2 306 827 A | 5/1997 |
| GB | 2 349 045 A | 10/2000 |
| JP | 59-097239 | 6/1984 |
| JP | 02-028580 | 1/1990 |
| JP | 3-291584 | 12/1991 |
| JP | 04-027887 | 1/1992 |
| JP | 07-146995 A | 6/1995 |
| JP | 08-015405 A | 1/1996 |
| JP | 09-026328 A | 1/1997 |
| JP | 09-113600 A | 5/1997 |
| JP | 10-190391 A | 4/1998 |
| JP | 20-01345747 A | 12/2001 |
| WO | WO 90/13186 A1 | 11/1990 |
| WO | WO 95/04407 | 2/1995 |
| WO | WO 96/22661 | 7/1996 |
| WO | WO 96/31016 A1 | 10/1996 |
| WO | WO 97/07609 A2 | 2/1997 |
| WO | WO 98/51568 A1 | 11/1998 |
| WO | WO 99/13598 A1 | 3/1999 |
| WO | WO 99/23769 A1 | 5/1999 |
| WO | WO 00/14902 A2 | 3/2000 |
| WO | WO 01/91310 A2 | 11/2001 |
| WO | WO 01/93458 A2 | 12/2001 |
| WO | WO 01/94969 A2 | 12/2001 |
| WO | WO 01/95220 A2 | 12/2001 |
| WO | WO 01/95522 A1 | 12/2001 |
| WO | WO 01/95523 A2 | 12/2001 |

OTHER PUBLICATIONS

Akyildiz, Ian F. et al., "HALO (High Altitude Long Operation)" A Broadband Wireless Metropolitan Area Network, IEEE International Workshop on Mobile Multimedia communications, Nov. 1999, pp. 271–275.

Bethke, K.H., A Novel Noncooperative Near–Range Radar Network For Traffic Guidance and Control on Airport Surfaces, IEEE Transactions on Control Systems Technology, vol. 1, No. 3, Sept. 1993.

Bricker, P. et al., "Integrated Receiver for NASA Tracking and Data Relay Satellite System" MILCOM 90, A New Era, 1990 IEEE Military Communications conference, Monterey, CA USA, Sept. 30–Oct. 3, 1990, pp. 1–5.

Casewell I.E., "The Provision of GSM Cellular Radio Environments Within Passenger Aircraft Operating Over Europe", Racal Res. Ltd., Walton–On–Thames, Mobile Radio and Personal Communications, 1989, Fifth International Conference, Dec. 11, 1989–Dec. 14, 1989, pp. 172–176.

Chiba, Isamu et al., "Digital Beam Forming (DBF) Antenna System for Mobile Communications", IEEE AES Systems Magazine, Sept. 1997, pp. 31–41.

Colella, Nicholas J. et al., "High Speed Internet Access via Stratospheric HALO Aircraft", INET 99 Proceedings, Internet Society, Technology, Wireless, 13 pages, Jun. 8, 1999.

Colella, Nicholas, "HALO Network—The Birth of Stratospheric communications Services & The Decline of Satellite Networks" HTTP://www.angelhalo.com/techpaper6, Copyright 1997–1999.

Divsalar et al., "Trellis Coded MPSK Modulation Techniques for MSAT–X", Proceedings of the Mobile Satellite Conference, May 3–5, 1988, NSA, JPL Publication 988–9, pp. 283–290.

Djuknic, Goran et al., "Establishing Wireless Communications Services via High–Altitude Aeronautical Platforms: A Concept Whose Time Has Come?" IEEE Communications Magazine, Sep. 1997, pp. 128–135.

Doc 9524 FANS/4–WP/76, International Civil Aviation Organization, Special Committee on Future Air Navigation Systems, Fourth Meeting, Montreal, May 2–20, 1988, Report, pp. 3.2B–2 & 3.2B–3.

Dunham, J.B. et al., "Onboard Orbit Estimation with Tracking and Data Relay Satellite System Data", Journal of Guidance, Control and Dynamics, Jul.–Aug. 1983, USA, col. 6 NR.4, pp. 292–301.

H.D. Griffiths et al., "Bistatic Radar Using Satellite–Borne Illuminators of Opportunity", IEEE, Radar 92, International Conference, Brighton, UK, 1992, pp. 276–279.

Martin, James N. et al., "HALO Network—Broadband Wireless Services from High Altitude Long Operation (HALO) Aircraft", HTTP://www.angelhalo.com/techpaper1, Copyright 1997–1998.

Martin, James N. et al., "HALO Network—The cone of commerce", HTTP://www.angelhalo.com/techpaper2, Copyright 1997–1998.

Miura, Ryu et al., "A DBF Self–Beam Steering Array Antenna for Mobile Satellite Applications using Beam–Space Maximal–Ratio Combination", IEEE Trans. On Vehicular Technology, vol. 48, No. 3, May 1999, pp. 665–675.

Sakakibara, Kunio et al., "A Two–Beam Slotted Leaky Waveguide Aray for Mobile Reception of Dual–Polarization DBS", IEEE Transactions on Vehicular Technology, vol. 48, No. 1, Jan. 1999, pp. 1–7.

Sato, Kazuo et al., "Development and Field Experiments of Phased Array Antenna For Land Vehicle Satellite Communications", IEEE Antennas and Propagation Society International Symposium, 1992, Jul. 1992, pp. 1073–1076.

Suzuki, R. et al., "Mobile TDM/TDMA System with Active Array Antenna", Global Telecommunications Conference, 1991; Globecom 1991, vol. 3, Dec. 2–5, 1991, pp. 1569–1573.

Teles, J., et al., "Overview of TDRSS", XP–002111610, Space Res., vol. 16, No. 12, pp. (12)67 0 (12)76, 1995 COSPAR, Great Britain.

U.S. patent application Ser. No. 09/271,997, Chang et al., filed Mar. 18,1999.

U.S. patent application Ser. No. 09/550,505, Chang et al., filed Apr. 17, 2000.

U.S. patent application Ser. No. 09/588,395, Chang et al., filed Jun. 6, 2000.

U.S. patent application Ser. No. 09/587,758, Chang et al., filed Jun. 6, 2000.

U.S. patent application Ser. No. 09/669,095, Yung et al., filed Sep. 25, 2000.

U.S. patent application Ser. No. 09/661,726, Feria et al., filed Sep. 14, 2000.

K. K. Chan, et al., "A Circularly Polarized Waveguide Array for Leo Satellite Communications", Antennas and Propagation Society, 1999, IEEE International Symposium, vol. 1, Jul. 11–16, 1999, pp. 154–157.

M. Oodo et al, "Onboard DBF Antenna for Stratospheric Platform", 2000 IEEE International Conference on Phased Array Systems and Technology, Proceedings, May 21–25, 2000, pp. 125–128.

Yokosuka Research Park, "The First Stratospheric Platform Systems Workshop", May 12–13, 1999, pp 1–216.

U.S. Appl. No. 09/576,648, filed May 22, 2000, Yung et al.
U.S. Appl. No. 09/576,652, filed May 22, 2000, Hagen et al.
U.S. Appl. No. 09/584,012, filed May 30, 2000, Chang et al.
U.S. Appl. No. 09/587,960, filed Jun. 6, 2000, Yung et al.
U.S. Appl. No. 09/587,759, filed Jun. 6, 2000, Yung et al.
U.S. Appl. No. 09/655,498, filed Sep. 5, 2000, Chang et al.

* cited by examiner

DYNAMIC CELL CDMA CODE ASSIGNMENT SYSTEM AND METHOD

TECHNICAL FIELD

The present invention relates generally to communications systems, and more particularly, to a code division multiple access system particularly suitable for mobile applications.

BACKGROUND ART

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. As such, satellites transmit and receive large amounts of signals used in either a "bent pipe" or "spot array" configuration to transmit signals to desired geographic locations on the earth.

Because the frequency resources are scarce for over-the-air transmission, various encoding schemes are used to provide a greater number of communication signals within an allocated communication band. Such encoding schemes include code division multiple access (CDMA), time division multiple access (TDMA), frequency division multiple access (FDMA), or combination of these schemes. Further, to prevent interference the schemes may operate at various frequencies.

CDMA systems are commonly used in mobile applications. In the mobile applications a plurality of base stations are positioned to provide coverage for a cell of a service area. Each of the base stations has a plurality of orthogonal codes that are used in each base station. The same group of orthogonal codes are reused in a cell covered by another base station a predetermined distance away. No central code management resource is needed because the base station with the same orthogonal codes is located sufficient distance so that interference does not occur. As the mobile user travels throughout the service area, frequency switching must occur often as the user travels into the range of another base station. Frequency switching may cause inconvenience such as discontinuity during switching time. Also, the additional signaling required for frequency switching adds to higher overhead in the system.

It would therefore be desirable to provide a CDMA management scheme that reduces the amount of switching of users between the various orthogonal codes.

SUMMARY OF THE INVENTION

It is therefore one object of the invention to provide an improved CDMA system that allows minimal switching of CDMA codes over a service area.

In one aspect of the invention, a method for operating a communication system comprises the steps of:
assigning a first code to a first beam of a mobile user;
assigning the first code to a second beam of a user;
moving the first beam with the mobile user;
continually determining whether an interference occurs between the first beam and the second beam;
when an interference occurs, reassigning a second code to the first beam.

In a further aspect of the invention, a communications system has a first mobile user device and a second user device. A high altitude communications device is in communication with the first mobile user device and the second user device. The high altitude communications device assigns a first beam having a first code to the first mobile user and assigns a second beam having the first code to the second user. The device continually determines whether an interference occurs between the first beam and the second beam and, when an interference occurs, reassigns a second code to the first beam.

One advantage of the invention is that the complexity of the overall system is reduced and thereby the overall system cost is reduced. By reducing the complexity the weight of the payload for the high altitude communications device is also reduced.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
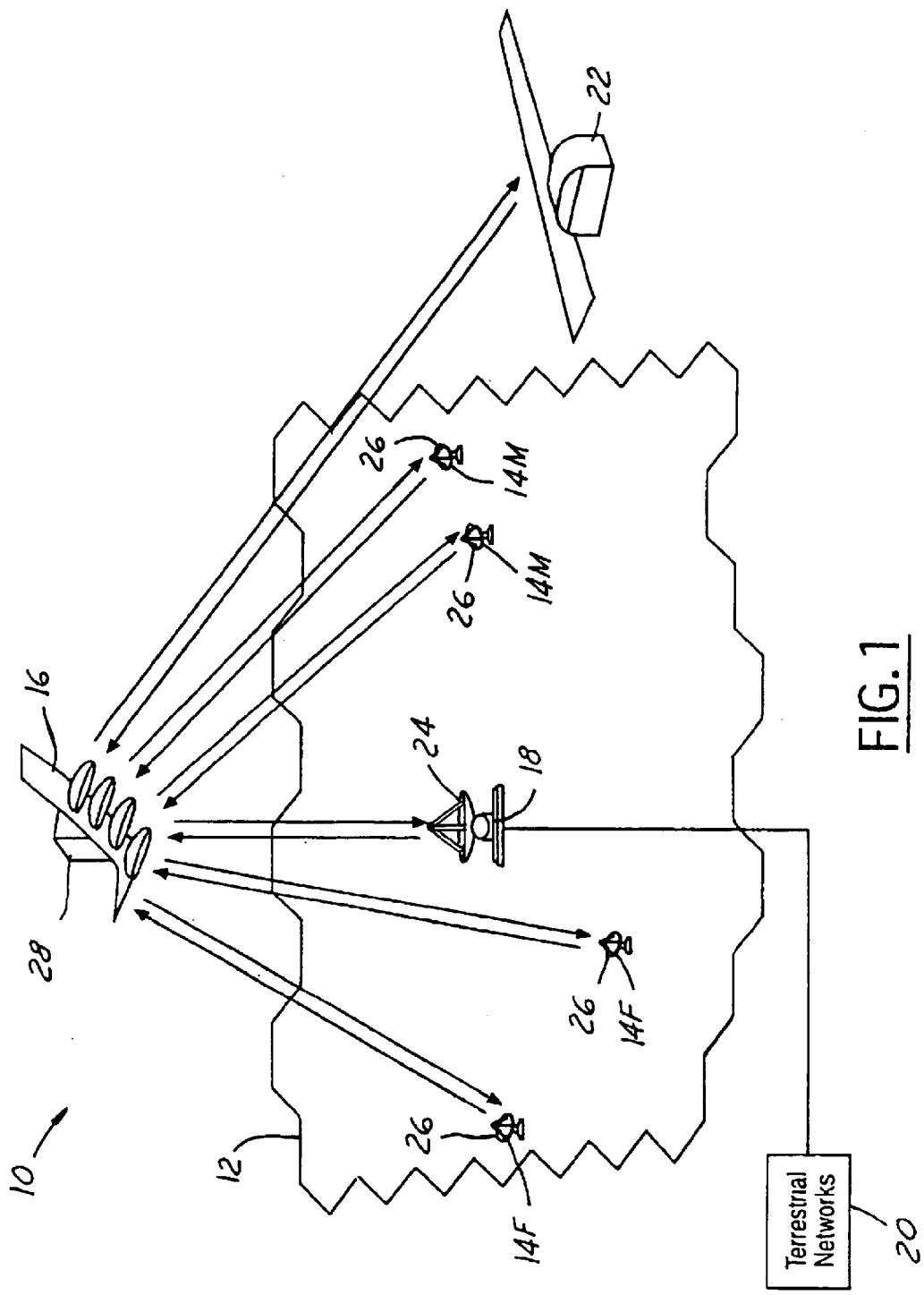
FIG. 1 is a system diagram of a preferred embodiment in the invention.

In the following figures the same reference numerals are used to identify the same components in the various views.

The present invention is applicable to many communications systems including various mobile, fixed, point-to-point broadcast and other types of communications.

Referring now to FIG. 1, a communications system 10 is used to cover a predetermined service area 12 on the earth's surface. A plurality of user terminals 14M and 14F are used to illustrate mobile users and fixed users respectively. Mobile user terminals 14M may comprise but are not limited to automotive applications, personal digital assistant applications, and cellular phone applications. Fixed user terminals 14F may, for example, comprise business based or home based communications systems. Each user terminal 14F,14M may receive a signal with a predetermined signal strength or receive an antenna radiation spot in a spot beam pattern that is available from and provided by high altitude communications device 16.

Communications system 10 further includes a gateway station 18 that is coupled to terrestrial networks 20 and a device operations center 22. Both gateway station 18 and device operations center 22 are in communication with high altitude communications device 16. Gateway station 18 provides a link between user terminals 14F,14M and terrestrial networks 20 through high altitude communications device 16. Device operations center 22 provides command and control functions to communications device 16. Although illustrated as two separate units, gateway station 18 and device operations center 22 may be combined into the same physical location.

High altitude communications device 16 may, for example, be a low earth orbit satellite (LEO), middle earth orbit (MEO) satellite or a geostationary orbit (GEO) satellite. Also, communications device 16 may also comprise a stratosphere-based platform. A stratospheric platform is preferably an unmanned vehicle that can fly for several months at an altitude of about 60,000 feet above the earth in small circles. The stratospheric platform 16 has numerous advantages including that capacity can be concentrated over a populated area, transmission delays associated with geostationary satellites are significantly reduced, the power for transmitting and receiving is substantially smaller than satellites, and the elevation angles of the system are high. The stratospheric platforms may also deploy relatively rapidly compared to satellites and thus, if the need increases, the system capability may be increased or modified. If the device is a stratospheric platform, the device operation center 22 may control the platform to fly in a small radius flight path over a given spot on the earth. Device operations center 22 may also provide replacement of parts and platforms for system 10.

The platform 16 is used as a communications node for gateway station 18 and user terminals 14M and 14F, each of which have antennas that are pointed in the direction of the platform. The gateway antenna 24 of gateway station 18 and user terminal antennas 26 has a beam width wide enough to maintain communication links with platform 16 throughout the flight path. In the case of a medium earth orbit and low earth orbit satellite, antennas 24,26 may be electronically steered. The antennas 24,26 allow for large data throughput.

High altitude communications device 16 has a controller 28 that is used to control communications with the user terminals 14F,14M. In the present invention, the controller 28 is used to generate a plurality of beams in a code division multiple access system. In a code division multiple access system, each beam is assigned an orthogonal code. Various numbers of users may communicate within a beam. Typically, a predetermined number of codes are used over the service area. As will be further described below, the beams are assigned codes that do not interfere with adjacent beams. Upon the detection of an interference, the code may be switched for a particular beam and thus for a particular user. In the following description, the code referred to is an orthogonal code. However, various groups of orthogonal codes may be classified together as a single code for the purposes of the following description.

Figure 2A:
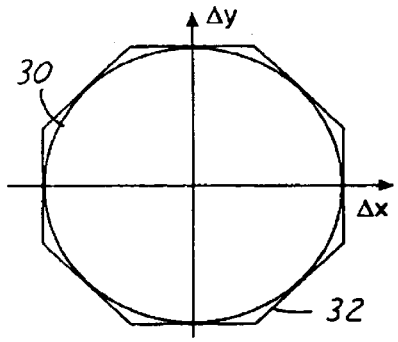
FIG. 2A is a octagonal approximation of a circle representing the Euclidean distance between two points.

Referring now to FIG. 2A, a beam 30 is shown as approximately circular in area. Beam 30 may be approximated, for example, by an octagon 32 for interference purposes. The beam 30 has an outer boundary defined where an interference level is tolerable. For example, the beam 30 may be approximated at the 20-dB side load contour. The interference contours may be of different shape and size throughout the coverage area. This is a result of maximizing the resource utilization instead of equalizing the beam size and shape. If a second beam has a center beyond the beam 30 or an octagonal approximation 32, then no interference is present. An interference is present when the center of another beam is within beam 30 or the approximation of octagon 32. The present invention is particularly suitable for mobile applications and therefore the beams move with the users and continual interference checking must be performed.

Figure 2B:
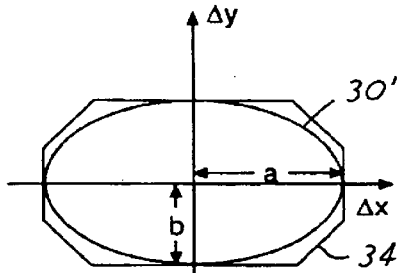
FIG. 2B is a polygonal approximation of an ellipse.

Referring now to FIG. 2B, a beam 30' is illustrated with a polygonal approximately 34. As mentioned above, the beam 30' may be a variety of shapes depending on the particular system requirements. However, adjacent users should be outside the polygonal approximation 34 to prevent interference.

Figure 3:
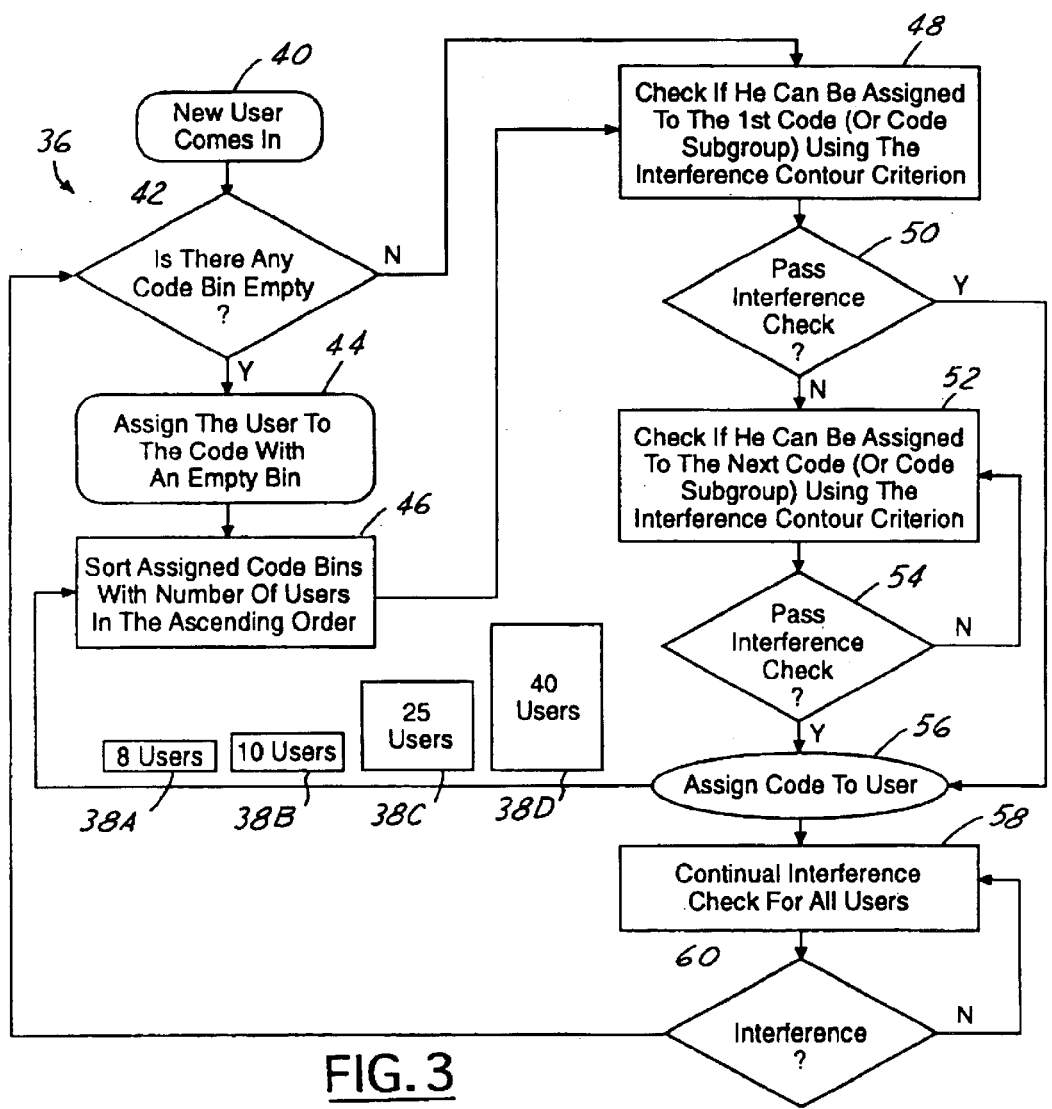
FIG. 3 is a flow chart illustrating the preferred method of operating the present invention.

Referring now to FIG. 3, a method 36 for operating the present invention according to a code division multiple access system is illustrated. As illustrated for simplicity, four code bins 38A–38D are illustrated. The various numbers of users in the system in each code bin are illustrated as well. For example, in bin 38A, 8 users are present, in bin 38B, 10 users are present, in bin 38C, 25 users are present, and in bin 38D, 40 users are present. When a new user comes into the system in step 40, step 42 checks to determine whether there are any empty code bins. If there are empty code bins in step 42, the new user is assigned a code within the empty bin in step 44. In step 46, the code bins are sorted with the number of users in ascending order as illustrated by bins 38A–38D.

Referring back to step 42, if there are no code bins empty, step 48 is executed. In step 48, the position of the user relative to the other code groupings are determined. That is, preferably, the bin 38 with the lowest number of users is selected. The position of the user relative to the other code users in the first bin are determined and an interference contour is developed. If an interference is found, then step 52 is executed in which the code bin with the second lowest number of users is checked to determine whether there is an interference between the location of the second user and the other users of the second code. In step 54, if an interference is found in the second code, the codes are incremented until a suitable code is found. That is, if an interference is found in step 54, step 52 is re-executed until a suitable code is found.

If in step 50 or 54 no interference is found, then the user is assigned a code in step 56. The bins are then resorted in step 46 to an ascending order for further interference determinations. After step 56, step 58 is executed that provides a continual interference check for all users. Because the system is suitable for mobile applications, the users are continually moving and thus continual checks are necessary to prevent interference between the codes as the movers move about the service area 12. In step 58, if an interference is not found between a mobile user and other users, then step 58 is continually executed.

If in step 58 interference is found between the mobile user and other users, then steps 42 et seq. are executed as described above so that the user may be reassigned another code that does not interfere with other users.

Thus, in the present invention, the user is assigned a code and the beam moves with the user until the user interferes with another user with the same code. Then, another code is assigned to the beam corresponding with the user.

Figure 4:
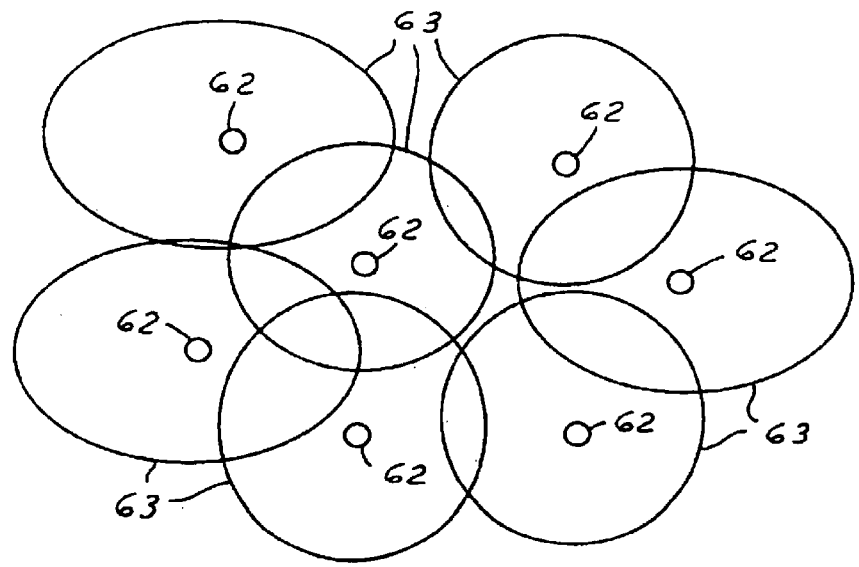
FIG. 4 is a plot illustrating a first code assignment of the present invention.

Referring now to FIG. 4, a plurality of users 62 are illustrated with a corresponding beam 63. Although the beams 63 overlap, the beams do not incorporate another user and thus the orthogonal code assignment for the beams 63 do not interfere.

FIG. 4 also illustrates that the size of the beam may vary. As those skilled in the art would recognize, the beam pattern may also be referred to as a "color." Thus, FIG. 4 illustrates a single color of code assignments. As mentioned above, beams 63 may also represent a plurality of codes rather than a single code.

Figure 5:
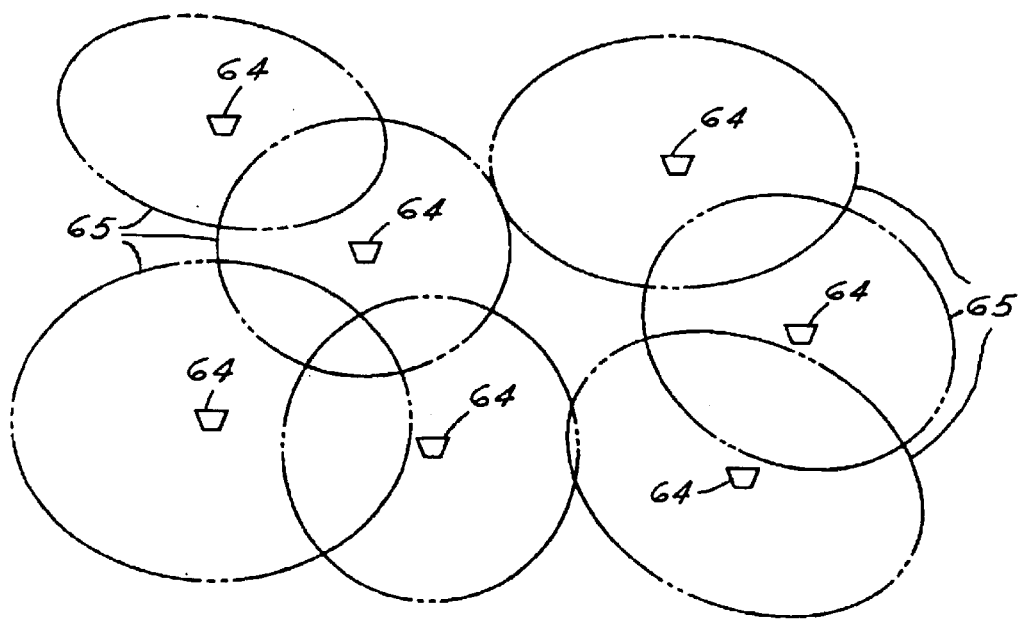
FIG. 5 is a plot of a second code assignment according to the present invention.

Referring now to FIG. 5, a plurality of users 64 having corresponding beam 65 is illustrated in a non-interfering manner. FIG. 5 thus illustrates a second color.

Figure 6:
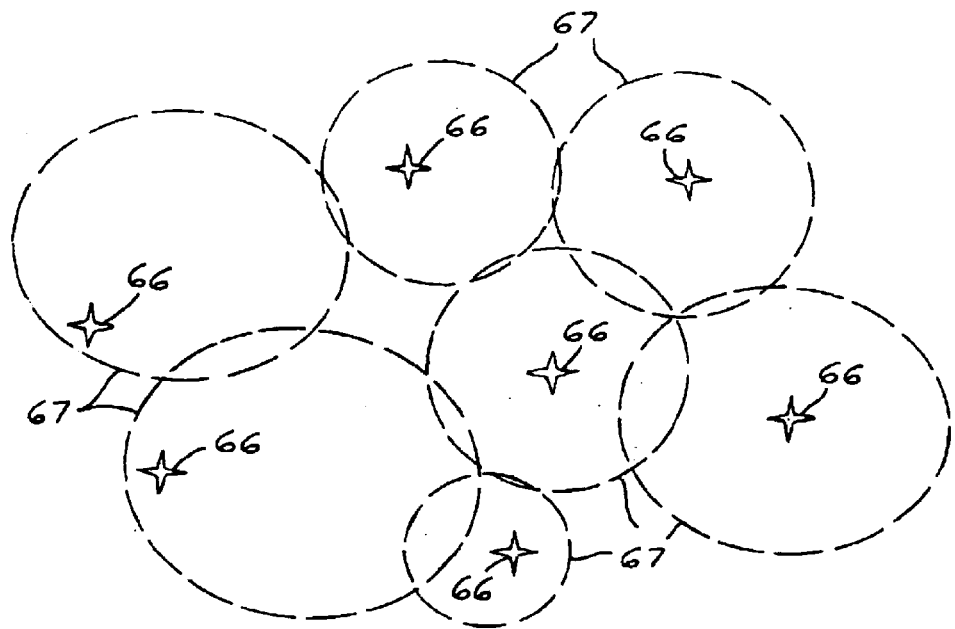
FIG. 6 is a plot of a third code assignment according to the present invention.

Referring now to FIG. 6, a third set of users 66 is illustrated with corresponding beams 67. Thus, FIG. 6 illustrates a third color of a multi-color system.

Figure 7:
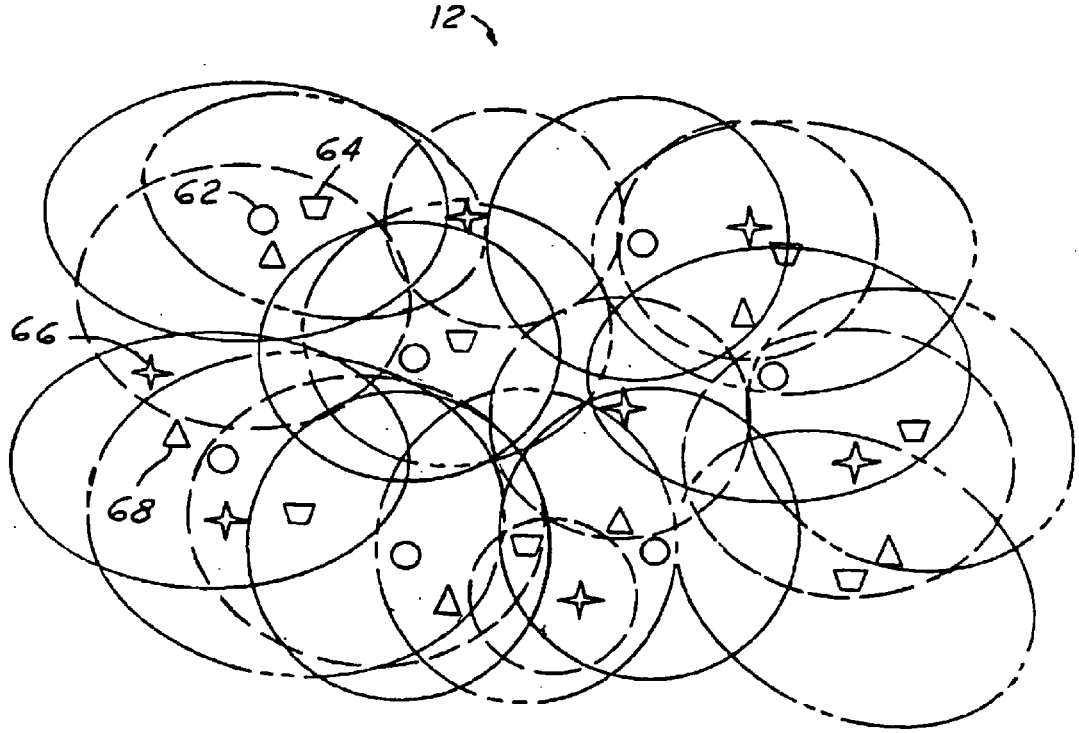
FIG. 7 is a plot showing the combination of a four code assignment system.

FIG. 7 illustrates a system illustrating the combination of the various users over the service area 12. FIG. 7 is merely illustrative of a potential snapshot of the present invention. Because the system is designed for mobile users, the various positions of the users changes over time.

Advantageously, the present invention provides a system that allows the user to maintain a code assignment until the code assignment interferes with another user. Thus, the controller 28 on the high altitude communications device 16 may be reduced in size and complexity. This type of configuration is particularly suitable for high altitude communications devices such as satellites or stratospheric platforms. Also, only four code assignments have been illustrated. However, those skilled in the art will recognize more or a greater number of code assignments may be used. Thus, no predefined cells are present in the present invention.

While particular embodiments of the invention have been shown and described, numerous variations alternate embodiments will occur to those skilled in the art. Accordingly, it is intended that the invention be limited only in terms of the appended claims.

What is claimed is:

1. A method of operating a communication system comprising the steps of:
   assigning a first code to a first beam of a mobile user;
   assigning a first code to a second beam of a second user;
   moving the first beam with the mobile user;
   continually determining whether an interference occurs between the first beam and the second beam; and,
   when an interference occurs between the first beam and the second beam, reassigning a second code to the first beam from a plurality of code bins.

2. A communications system comprising:
   a first mobile user device;
   a second user device; and,
   a high altitude communications device in communication with the first mobile user device and the second user device, the high altitude communications device assigning a first beam having a first code to the first mobile user and assigning a second beam having the first code to the second user, said device continually determining whether an interference occurs between the first beam and the second beam and, when an interference occurs, reassigning a second code to the first beam from a plurality of code bins.

3. A system as recited in claim 2 wherein said high altitude communications device comprises a communications platform.

4. A system as recited in claim 3 wherein said communications platform is located in a stratospheric location.

5. A system as recited in claim 2 wherein said high altitude communications device comprises a satellite.

6. A system as recited in claim 5 wherein said satellite is selected from the group consisting of a medium earth orbit satellite, a low earth orbit satellite, and a geostationary satellite.

7. A system as recited in claim 2 further comprising a device operations center.

8. A system as recited in claim 7 further comprising a gateway station coupled to the high altitude communication device.

9. A system as recited in claim 8 wherein said gateway station couples said first mobile user device and said second user device to terrestrial networks through the high altitude communications device.

10. A method of operating a communications system comprising the steps of:
    introducing a first user into the system;
    establishing a plurality of code bins;
    when an empty code bin exists, assigning the first user to an empty code bin;
    when no empty code bin exists, determining whether the first user may be assigned to a first one of the plurality of code bins by performing an interference check;
    when the interference check is not passed, determining a second one of the plurality of code bins;
    performing an interference check with the second of the plurality of code bins; and,
    when an interference of the second code bin is not found, assigning the first user a second code associated with the second bin.

11. A method as recited in claim 10 further comprising introducing subsequent users into the system;
    performing an interference check for each of the subsequent users;
    assigning a non-interference code to each of the subsequent users.

12. A method as recited in claim 10 further comprising continually determining whether an interference occurs between the first user and subsequent users, when an interference occurs assigning a non-interfering code thereto.

13. A method as recited in claim 10 wherein introducing a first user into the system comprises introducing the first user into the system comprising an automotive communication system.

14. A method as recited in claim 10 wherein introducing a first user into the system comprises introducing the first user into the system comprising a personal digital assistant communication system.

15. A method as recited in claim 10 wherein introducing a first user into the system comprises introducing the first user into the system comprising a cellular phone communication system.

16. A method as recited in claim 10 wherein introducing a first user into the system comprises introducing the first user into the system comprising a business-based communication system.

17. A method as recited in claim 10 wherein introducing a first user into the system comprises introducing the first user into the system comprising a home-based communication system.

18. A method as recited in claim 10 further comprising the step of monitoring a number of users of a code in each of the plurality of code bins;
    wherein the step of assigning the first user a second code comprises assigning a second code to the first user corresponding to a second code bin having a least number of users.

19. A system as recited in claim 2 wherein said communication system comprises a personal digital assistant communication system.

20. A system as recited in claim 2 wherein said communication system comprises a cellular phone communication system.

21. A system as recited in claim 2 wherein said communication system comprises a business-based communication system.

22. A system as recited in claim 2 wherein said communication system comprises a home-based communication system.

23. A method for code management system comprising:
assigning each one a plurality of users a code from a plurality of non-interfering codes;
moving the plurality of users;
continually monitoring the plurality of users for an interference; and
when a first user of the plurality of users interferes with another of said plurality of users, assigning another non-interfering code to said first user from a plurality of code bins.

24. A method for code management comprising:
establishing a plurality of code bins having a respective plurality of codes;
assigning each of said plurality of users to one of the plurality of codes so that each of said plurality of users does not have an interfering code with an adjacent user;
moving the plurality of users;
continually monitoring the plurality of users for an interference;
when one of the plurality of users interferes with another of said plurality of users, assigning a non-interfering code to said one of the plurality of users.

25. A method as recited in claim 24 further comprising the step of monitoring a number of users of a code in the code bin;
wherein the step of assigning a non-interfering code to said first user comprises assigning a non-interfering code corresponding to one of the plurality of code bins having a least number of users.

* * * * *